United States Patent [19]
Gram

[11] 3,733,846
[45] May 22, 1973

[54] ANNULAR TABLE FOR A ROTATING FREEZING APPARATUS

[75] Inventor: Hans Gram, Vojens, Denmark

[73] Assignee: Brodrene Gram A/S, Vojens, Denmark

[22] Filed: Oct. 22, 1971

[21] Appl. No.: 191,590

[30] Foreign Application Priority Data

Oct. 27, 1970 Denmark..................................5459

[52] U.S. Cl......................................62/345, 62/381
[51] Int. Cl................................................F25c 7/12
[58] Field of Search..............................62/345, 381

[56] References Cited

UNITED STATES PATENTS

| | | | |
|---|---|---|---|
| 2,246,941 | 6/1941 | Hoyer | 62/345 |
| 2,700,347 | 1/1955 | Gram | 62/345 |
| 2,791,890 | 5/1957 | Hoyer | 62/345 |
| 3,024,622 | 3/1962 | Gram | 52/387 |
| 3,261,178 | 7/1966 | Okada | 62/381 |
| 3,535,889 | 10/1970 | Curti | 62/381 |

*Primary Examiner*—William J. Wye
*Attorney*—Watson, Cole, Grindle & Watson

[57] ABSTRACT

Annular table for a rotating freezing apparatus wherein the lower surface of the table is subjected to the action of the freezing medium, wherein the table is divided into a plurality of adjacent sections, each of such sections having duct means secured to their adjacent edges, the duct means of two adjacent edges forming in cooperation a duct extending in the radial direction of the table and being open at least at one end thereof, each of said adjacent duct means comprising a lip, the lips of two adjacent duct means forming a narrow slit along the bottom of the duct formed by said two adjacent duct means.

3 Claims, 6 Drawing Figures

ANNULAR TABLE FOR A ROTATING FREEZING APPARATUS

BACKGROUND OF THE INVENTION

The present invention relates to an annular table for a rotating freezing apparatus of the kind wherein the lower surface of the table is subjected to the action of a freezing medium.

Annular tables of the kind referred to above have previously been made in the form of an annular plate in one piece.

SUMMARY OF THE INVENTION

The annular table according to the present invention is divided into a plurality of adjacent sections each of which has duct means secured to their adjacent edges, the duct means of two adjacent edges form in cooperation a duct which extends in the radial direction of the table and is open at least at one end, each of said adjacent duct means comprises a lip and the lips of two adjacent duct means form a narrow slit along the bottom of the duct formed by such two adjacent duct means. By means of this construction the table can be manufactured in several pieces, viz. the sections referred to, and the mounting of such sections for assembling a workable table is very easily done because no complete sealing is necessary between the duct means. This is due to the fact that the ducts formed at the junctions between the sections will be able to receive the freezing medium which may leak into the ducts through the narrow slits and to conduct such freezing medium outwardly through the ducts to the open ends thereof before the ducts will be filled with inflowing freezing medium and accordingly before such medium will overflow the upper surface of the table. Accordingly, the sections can be placed together directly for forming the table without any precautions being made in order to seal the junctions between the adjacent sections.

According to the invention the lips may form a labyrinth packing. Such embodiment is preferable in case broad lips would impede the flowing of the freezing medium. However, the lips may also be flat and arranged with the outer surfaces adjacent each other. If the table is of the kind wherein freezing pockets are provided, at least one of the lips may extend at least to the same depth as the bottoms of the pockets. The last mentioned embodiment is preferable due to the fact that the broad lip will serve a double object, viz. form both one side of the slit and serve as guiding plate for directing the flow of the freezing medium with respect to the freezing pockets.

DESCRIPTION OF THE PREFERRED EMBODIMENTS

Figure 1A:
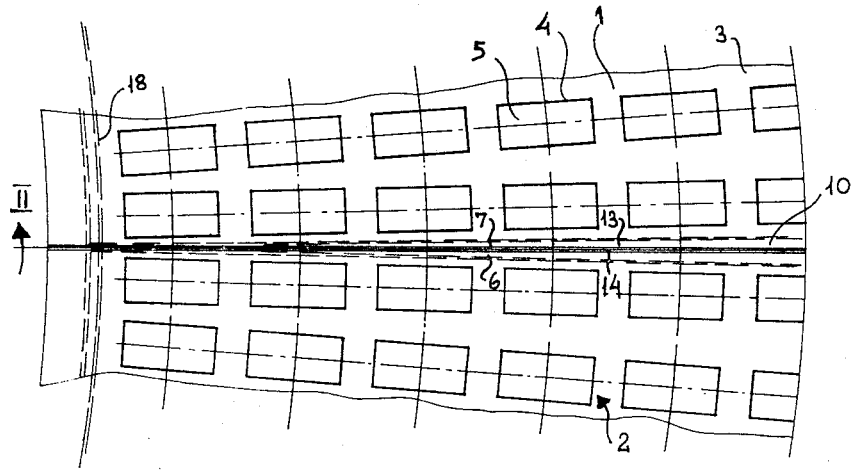
FIG. 1 illustrates a radial fraction of a table according to the invention.
Figure 1B:
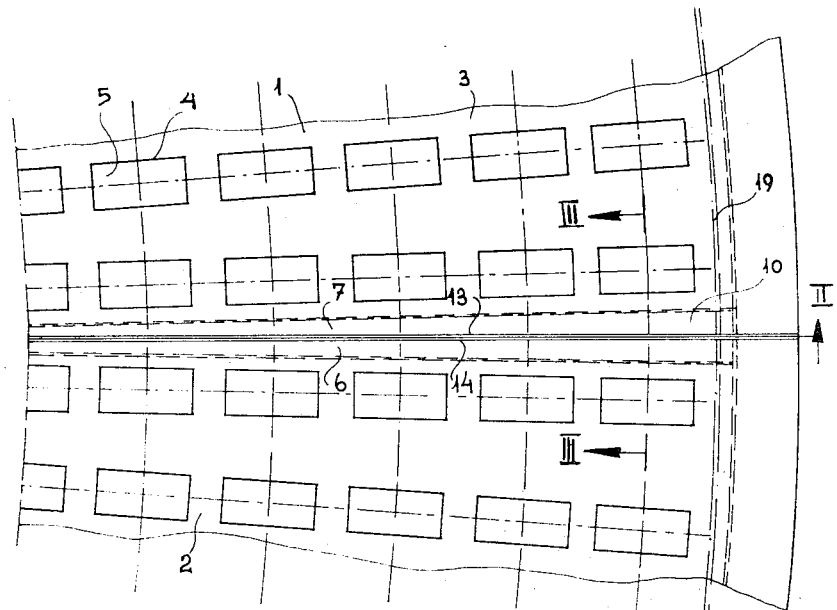
Figure 2A:
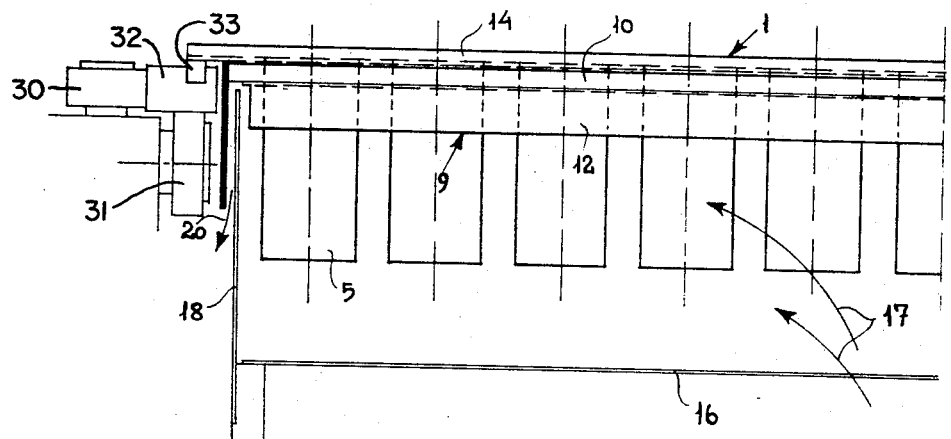
FIG. 2 a section along the section line II—II in FIG. 1.
Figure 2B:
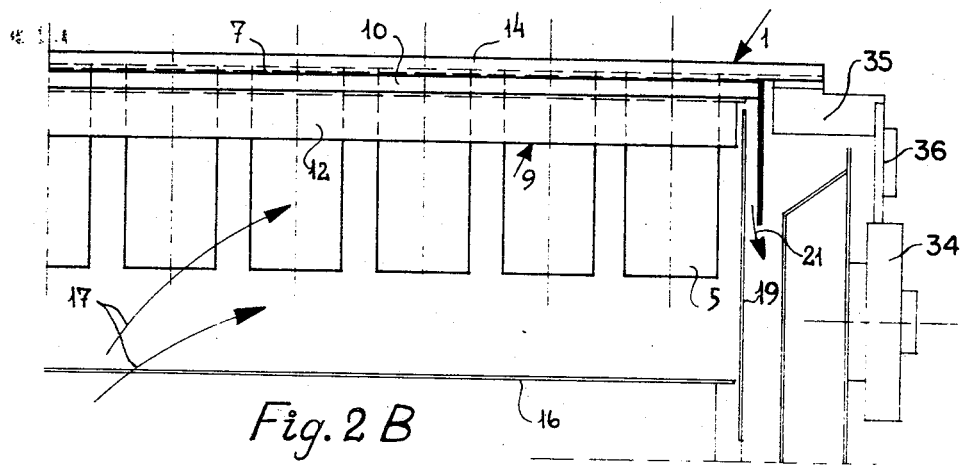
Figure 3:
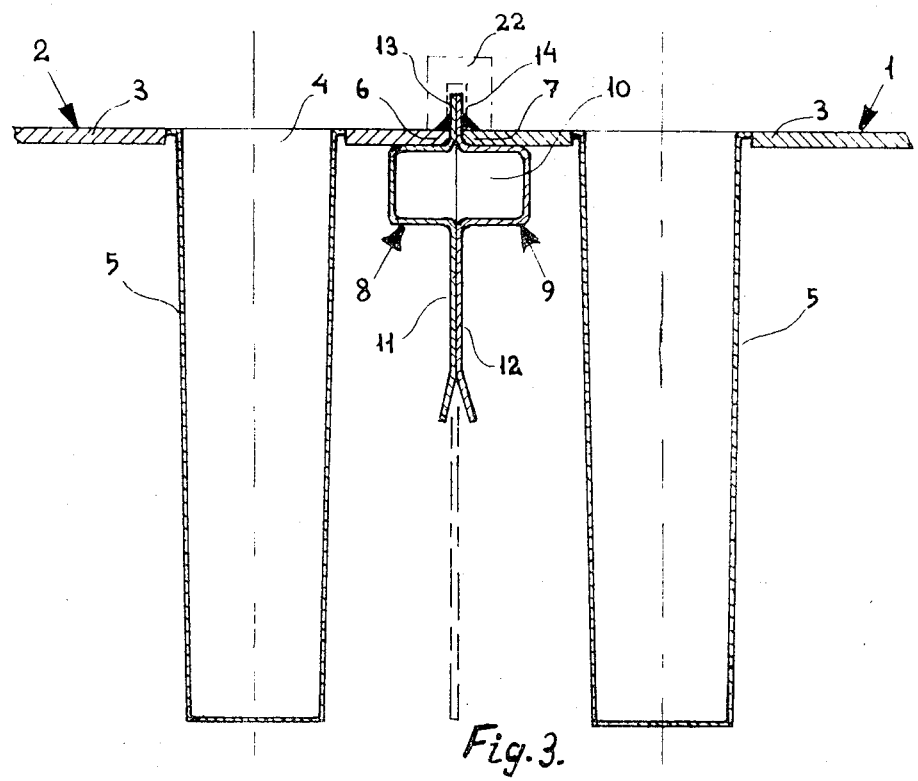
FIG. 3 a section along the section line III—III in FIG. 1.

The table illustrated in FIGS. 1–3 consists of a plurality of sections of which only two adjacent portions 1 and 2 of such sections are shown. Each section consists of a piece of metal sheet formed as a segment of an annulus defined by two radially extending edges 6 and 7. Openings 4 are provided in each section and freezing pockets 5 are inserted in these openings as shown in FIG. 3. The upper ends of the freezing pockets are sealingly secured to the edges of the openings.

The elements located to the left of reference character 20 in FIG. 2A are conventional. The numeral 30 denotes a roller for guiding the inner edge of the table in the horizontal direction, and 31 is a supporting roller for supporting the inner edge of the table. The numeral 32 indicates a ring which cooperates with the two rollers 30 and 31 and which supports the table sections. Between ring 32 and the table sections a sealing strip 33 is provided.

The elements shown in FIG. 2B, located to the right of the reference character 21, are also conventional. The numeral 34 indicates a roller for supporting a rail 36 which supports a ring 35, which in turn supports the outer edge of the circumference of the table. All these elements are commonly used for apparatus of the kind here in question.

As it clearly appears from FIG. 3 duct means 8 and 9 are secured to the adjacent edges 6 and 7, respectively, of two adjacent sections 1 and 2. The duct means 8 and 9 of two adjacent sections form, in the mounted position of the sections, a duct 10 which extends from the inner edge of the table to the outer edge thereof as indicated in FIG. 2. Each duct means comprises a plate having U-formed section, the branches of which are turned outwardly so as to form upwardly extending flaps 13,14 and downwardly extending lips 11 and 12. The flaps 13,14 are secured to the adjacent edges 6 and 7, respectively, of the two adjacent sections 1 and 2 and the two lips 11 and 12 lie closely adjacent each other and define a narrow slit. As it appears from FIG. 1, the duct 10 increases in width from the inner end to the outer end thereof.

Figure 4:
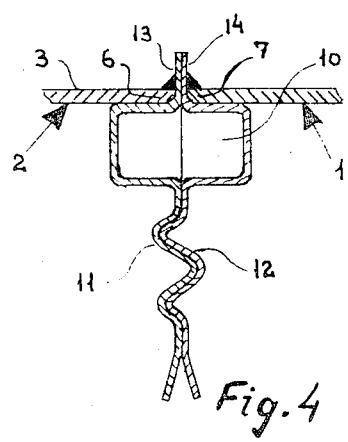
FIG. 4 a section corresponding to the section shown in FIG. 3, but through another embodiment of the table.

Naturally, several other sorts of slits may be used than the slit shown in FIG. 3. E.g. the lips 11 and 12 may be wave-formed as shown in FIG. 4 in order to form a labyrinth packing. The embodiment shown in FIG. 4 is used in case a great width of the lips 11 and 12 would impede the flowing of a freezing medium below the table. However, in some cases it is an advantage if at least one of the lips, as indicated by the broken line in FIG. 3, extends to the same depth below the table as the freezing pockets 5. In the latter instance the wide lip will be able to direct the flow of freezing medium between the freezing pockets.

The freezing medium is supplied to the space below the table in a way known per se for freezing apparatuses having rotating freezing tables, viz. through the bottom of a vessel 16 as indicated in FIG. 2 wherein arrows 17 indicate the direction of flow of the freezing medium.

The table sections are supported along the inner and outer edges of the table in a way known per se and indicated in FIG. 2. During the working of the apparatus the table is rotated about the vertical center axis of the table. Simultaneously freezing medium is circulated as indicated by the arrows 17 and the freezing medium leaves the area of the table via weirs 18 and 19 as indicated by means of arrows 20 and 21.

No special precautions have been taken in order to secure complete sealing between the adjacent edges 6 and 7 of adjacent sections, and accordingly the slits formed between the lips 11 and 12 do not prevent inflow of freezing medium. However, the slits between the table sections impede the inflow of freezing medium to a rate such that the inflowing freezing medium can escape along the ducts 10 to the weirs 18 and 19 at which the ducts are open, before the level of the pressure of the freezing medium in the ducts 10 reaches a value at which outflow will occur between the upwardly directed flaps 13,14. Adjacent sections are mutually secured by means of U-shaped clamps 22 as indicated in FIG. 3.

I claim:

1. Annular table for a rotating freezing apparatus, wherein the lower surface of the table is subjected to the action of the freezing medium, wherein the table is divided into a plurality of adjacent sections, each of such sections having duct means secured to their adjacent edges, the duct means of two adjacent edges forming together a duct extending in the radial direction of the table and open at least at one end of the duct, each of said adjacent duct means comprising a lip extending downwardly from said duct, the lips of two adjacent duct means being arranged in abutting position.

2. Annular table according to claim 1, wherein the lips form a labyrinth packing.

3. Annular table according to claim 1 having freezing pockets projecting downwardly from the lower surface of the table wherein at least one of the lips extends below the table at least to the same depth as the bottom of the freezing pockets.

* * * * *